United States Patent [19]
Mahon et al.

[11] Patent Number: 4,809,160
[45] Date of Patent: Feb. 28, 1989

[54] PRIVILEGE LEVEL CHECKING INSTRUCTION FOR IMPLEMENTING A SECURE HIERARCHICAL COMPUTER SYSTEM

[75] Inventors: Michael J. Mahon, San Jose; Allen Baum, Palo Alto; William R. Bryg, Saratoga; Terrence C. Miller, Menlo Park, all of Calif.

[73] Assignee: Hewlett-Packard Company, Palo Alto, Calif.

[21] Appl. No.: 792,702

[22] Filed: Oct. 28, 1985

[51] Int. Cl.$^4$ .............................................. G06F 12/14
[52] U.S. Cl. ..................................... 364/200; 178/29; 178/37
[58] Field of Search ... 364/200 MS File, 900 MS File; 380/3, 4, 23, 25, 29, 37

[56] References Cited

U.S. PATENT DOCUMENTS

| | | | |
|---|---|---|---|
| 4,087,856 | 5/1978 | Attanasio | 364/200 |
| 4,104,721 | 8/1978 | Markstein | 364/200 |
| 4,346,436 | 8/1982 | Wise | 364/200 |
| 4,409,655 | 10/1983 | Wallach et al. | 364/200 |
| 4,434,464 | 2/1984 | Suzuki et al. | 364/200 |
| 4,471,163 | 9/1984 | Donald et al. | 380/4 |

Primary Examiner—Archie E. Williams, Jr.
Assistant Examiner—Emily Y. Chan

[57] ABSTRACT

A low overhead way for insuring that only routines of sufficient privilege can execute on a secured page of memory in an hierarchial computer system, and for raising the privilege level of a low privilege process in an orderly and secure way is presented. This is done through the execution of a single "gateway" branch instruction standing between a procedure call by a lower privileged routine, such as a user program, and an operating system itself.

3 Claims, 4 Drawing Sheets

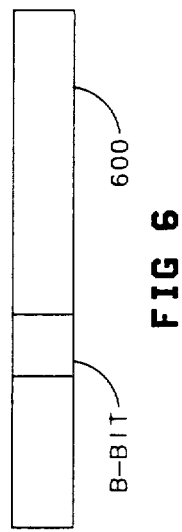
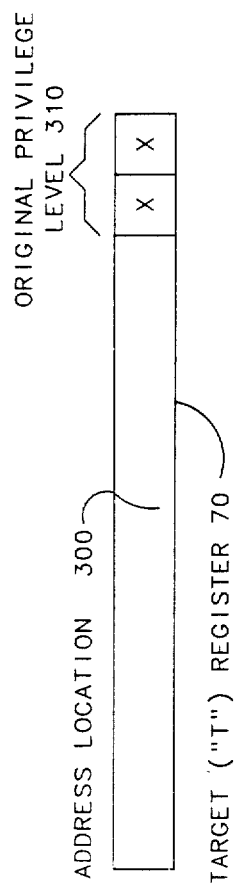
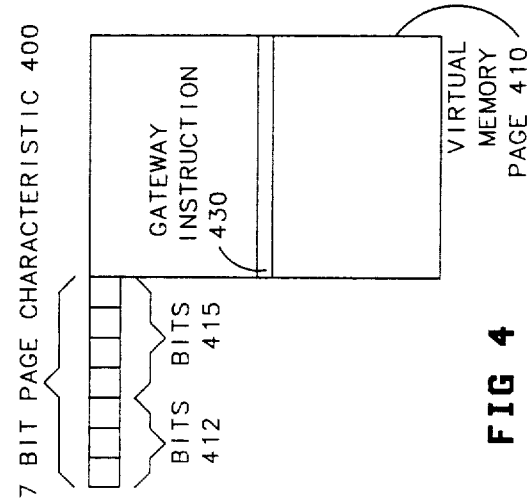
FIG 3
FIG 6
FIG 4

| TYPE | PRIVILEGE LEVEL 1 | PRIVILEGE LEVEL 2 | USE | PRIVILEGE LEVEL AFTER EXECUTION OF GATEWAY |
|---|---|---|---|---|
| 000 | READ | — | READ ONLY DATE | |
| 001 | READ | WRITE | NORMAL DATA | |
| 010 | READ/XLEAST | XMOST | NORMAL CODE | |
| 011 | READ/XLEAST | WRITE/XMOST | DYNAMIC CODE | |
| 100 | XLEAST | XMOST | PROPRIETARY/GATEWAY | 0 |
| 101 | XLEAST | XMOST | PROPRIETARY/GATEWAY | 1 |
| 110 | XLEAST | XMOST | PROPRIETARY/GATEWAY | 2 |
| 111 | XLEAST | XMOST | PROPRIETARY/GATEWAY | 3 |

FIG 5

PRIVILEGE LEVEL CHECKING INSTRUCTION FOR IMPLEMENTING A SECURE HIERARCHICAL COMPUTER SYSTEM

BACKGROUND OF THE INVENTION

In hierarchical computer systems, protection checking must occur whenever a process having lower privilege desires to call on a system wide service routine having higher privilege. Several levels of privilege are usually provided in such systems including a highest privilege available only to the operating system, one or more intermediate privilege levels available to either the operating system or intermediate program supervisors, and a lowest privilege level available to unprivileged operations and to user programs. When a user program needs to call the computer operating system to do something which can only be accomplished by the operating system itself, such as access a section of the physical memory in a virtually addressed computer memory, some form of protection must be provided so that the user program can only use the highly privileged routine in an orderly way. Without some form of protection there would be no data security in the system and any program would have unlimited access to all of the system data or a user program could actually destroy the operating system itself, both of which are unacceptable in most commercial systems. For example, if a payroll file is stored on the computer system and the system lacked privilege protection, someone could merely write a user program to give himself a raise.

Such protection checking is a frequent operation that usually involves significant system resources in validating the privileges and access rights of the calling routine, resulting in a substantial degradation in system performance. Previous systems have frequently used "supervisor call" instructions to limit the number of entry points available into the operating system. With such supervisor call instructions, a user program seeking higher privilege actually causes a hardware interrupt of the system processor, during which the system will branch to a single operating system location. The operating system must then figure out what it was that the user wanted to do, branch out through a large privilege dispatch table, perform the desired operation, return to the single operating system location, store all the desired system states, and return to the user program. Not only is such a supervisor call time consuming, but such a system requires the supervisor call to be a unique instruction which is different from other normal procedure calls.

SUMMARY OF INVENTION

The present invention discloses a novel "gateway" instruction which provides privilege checking in a computer system in a single cycle operation without need for an interrupt or supervisor call. In addition, the gateway instruction permits an unlimited number of entry points into the operating system. Higher privilege services can be called using the same subroutine calling convention as is used for calling other procedures within the computer system so that the code that is compiled in the lower privileged routines in seeking a higher privilege level is the same as a "normal" procedure call. If the page of virtual memory on which the called entry point resides is one of a set of gateway types, then the gateway instruction will cause the routine's privilege to be raised to the level specified by the page itself, permitting the further desired execution requiring the higher privilege level, unless the routine's privilege is already greater than that of the page, in which case no change in privilege level is required.

The actual security check is performed by first checking the state of the privilege level of the currently running process against the bits in a seven bit access rights field associated with the virtual page address of the called routine during the virtual address translation performed by a Translation Lookaside Buffer (TLB). If the caller's privilege level is within bounds, the TLB permits the calling routine to execute instructions on the targeted virtual page. Execution of the gateway instruction will then proceed to branch to the location indicated by the gateway with the needed privilege level supplied by other bits in the access rights field of the TLB entry. However, if a calling routine attempts to execute on a page which requires higher or lower privilege than the routine currently has, the TLB will inhibit execution of instructions, including gateway instructions, with a software trap, so that the calling routine never performs the unpermitted instruction. Since this protection scheme can be nearly the same as that used to prevent the performance of other instructions from an unpermitted page, the gateway protection can be structurally the same as other instructions in the system.

Thus, the gateway instruction acts like a normal branch instruction relative to the state of the program counter (i.e., a PC relative branch). In addition, the gateway instruction also saves the original privilege level of the calling routine in a general register specified by a field of the gateway branch. This register is, by convention, the register containing the return link to the calling routine, the low-order bits of which are the two-bit privilege level of the caller. Since execution of the gateway instruction forces these two bits to the caller's actual privilege level, it is impossible for the calling routine to forge a return link which could cause return to the caller with higher privilege.

Also, if the routine called by the calling routine requires the services of an even more privileged routine, the called routine may itself call through another gateway, as before.

Finally, in a computer system which permits delayed branches, such as in a conventional pipelined machine in which delayed instructions are not actually executed until a given number of machine cycles (the delay period) after the delayed instruction is begun, one caution must be exercised with the gateway instructions: The calling routine must not be permitted to execute a gateway instruction in the delay period of a taken branch, since this would result in execution of the gateway (and privilege promotion) followed by a change of control back to the calling routine at higher privilege. The effect of such an operation would be for the calling routine to effectively promote its own privilege level without control of the operating system, thus destroying the entire protection checking mechanism.

BRIEF DESCRIPTION OF THE DRAWING

FIG. 3 shows the structure of a Target Register for holding the original privilege level of a calling routine during the execution of a gateway instruction according to the present invention.

FIG. 4 shows a block diagram of a memory page containing a gateway instruction according to a preferred embodiment of the present invention.

FIG. 5 shows a table containing access rights for use according to a preferred embodiment of the present invention.

FIG. 6 shows a processor status word with the system shown in FIG. 1.

DESCRIPTION OF THE PREFERRED EMBODIMENT

Figure 1:
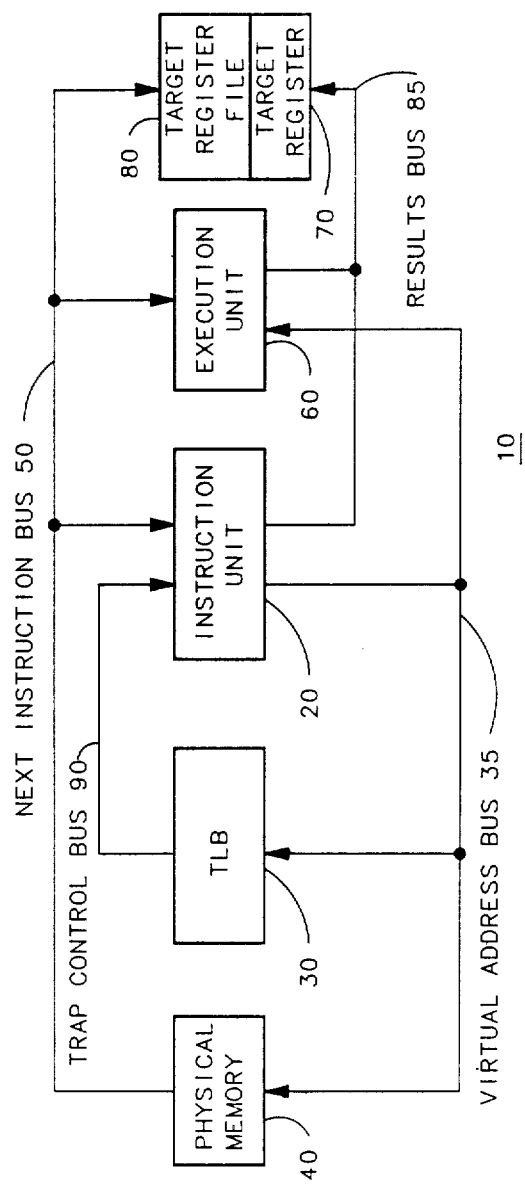
FIG. 1 shows an overall computer system block diagram for utilizing a protection system according to a preferred embodiment of the present invention.
Figure 2:
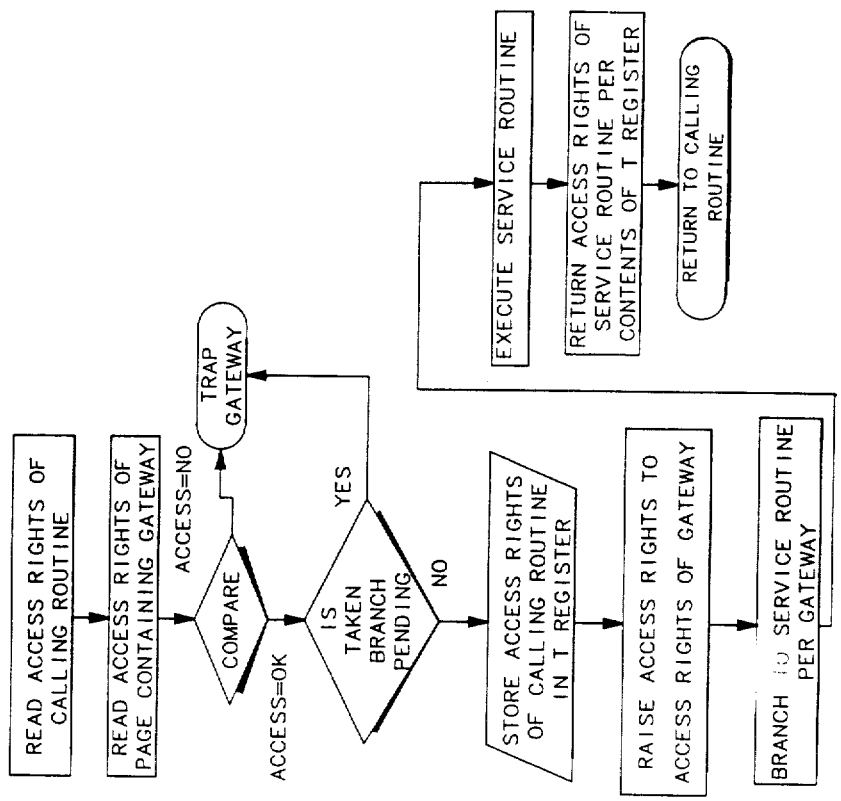
FIG. 2 shows a flow chart for protecting the system shown in FIG. 1.

FIG. 1 shows a block diagram of a pipelined computer system 10 for using a gateway instruction according to the present invention and FIG. 2 shows a flow chart for using the gateway instruction for protecting the system 10. An Instruction Unit 20 contains a low privilege routine which requires a procedure call to a higher privileged service routine. The Instruction Unit 20 seeks this higher privileged routine by addressing the Translation Lookaside Buffer (TLB) 30 via the Virtual Address Bus 35 to determine the location in Physical Memory 40 containing an appropriate entry point of a gateway instruction. Typically, the various entry points of the gateway instructions are published within the system documentation for programming use. The TLB 30 calculates the address of the desired entry point within the Physical Memory 40 and a gateway instruction located at the calculated address is then transmitted via a Next Instruction Bus 50 from the Physical Memory 40 to the Instruction Unit 20, to an Execution Unit 60 and to a physical Target Register 70 within the Register File 80.

A return address for returning from the higher privileged service routine is then stored in the Target Register 70 by the Instruction Unit 20 via a Results Bus 85. The Target Register 70 as shown in FIG. 3 contains the return address in Address Location 300 with the original, lower privilege level stored in two lower order bits 310. The TLB 30 then checks the access rights of the calling instruction as will be described shortly to determine if execute access is permitted. If execute access is denied by the TLB 30, a software trap is transmitted from the TLB 30 to the Instruction Unit 20 on a Trap Control Bus 90 to halt execution of the gateway instruction in the Execution Unit 60. If execute access is allowed by the TLB 30, and no delayed taken branch is pending, the gateway instruction resaves the actual privilege level of the calling routine in the two low-order bits of Target Register 70 (to rule out forgery by the calling routine), and raises the privilege level of the calling routine to the privilege level specified within the page type field 412 of the TLB entry for the page containing the gateway instruction, and a target address for branching to a called routine is calculated in either the Instruction Unit 20 or the Execution Unit 60, as appropriate. A target instruction located at the target address is then fetched from the Physical Memory 40 on the next instruction cycle of the system 10 for use in the Instruction Unit 20 and execution of the called service routine having the desired higher privilege proceeds in the Execution Unit 60. The gateway instruction therefore performs as a delayed branch from the entry point to the target instruction.

After the finally called service routine is completed, the Execution Unit 60 reads the return address stored in the Target Register 70 via the Results Bus 85 and returns to the calling routine at the specified return address with the original lower privilege stored in the Target Register 70.

The actual security protection by the TLB 30 is the same for "normal" instructions as for accessing a gateway instruction, and is performed with a granularity of an entire page of virtual memory. That is, once the execution access rights of a calling routine have been verified by the TLB 30, the calling routine will have execute access to all of the information on a virtual memory page 410, including a gateway instruction 430 as shown in FIG. 4. Each virtual page 410 has associated with it a page characteristic 400 containing access rights to the page and an access identifier. The page characteristic 400 is compared to the calling routine's access type (read, write, or execute), privilege level, and a set of protection identifiers to check if the calling routine is allowed to read, write or execute on that memory page 410. The access rights are encoded in the seven bits of the page characteristic 400 with the first three bits 412 specifying a page type, and the last four bits 415 being two privilege level fields specifying the most or least privilege that the calling routine can have to be permitted to use the page 410. FIG. 5 shows how the access rights are encoded in the page characteristic 400, with XLEAST and XMOST being the least and most privileged levels that can execute, and READ and WRITE fields specifying the least privileged field that can have access to the page 410. Thus there are three types of access possible (read, write, and execute) for "normal" system functions, with loads checking only read access, stores checking only write access, and instruction fetch checking only execute access within XLEAST to XMOST bounds. In general, four different types of gateway pages as shown in FIG. 5 (i.e., Proprietary/Gateways 0, 1, 2, and 3) are sufficient for defining the desired number of different privilege levels within the system 10. With four different privilege levels, only two of bits 412 are required to define the four different states (00, 01, 10, and 11) of the gateways, and it is these two bits which determine the privilege level resulting from execution of a gateway instruction on the corresponding page.

As mentioned previously, gateway instructions cannot be permitted during the pipeline delay period of a taken branch instruction. In order to prevent this occurrence, a B-bit in a status word 600 as shown in FIG. 6 within the Instruction Unit 20 (see FIG. 1) is set to indicate whether a taken delay branch is pending. The B-bit is set by the Instruction Unit 20 on any taken branch, is true during the pipeline delay period, and is clearly by the Instruction Unit 20 on the next pipeline cycle after the delay period. Thus, as shown in FIG. 2, if a gateway instruction is attempted while a taken branch is pending, the gateway will be trapped as invalid to prevent the calling routine from promoting its own privilege level.

What is claimed is:

1. A method of securing a computer system having a memory and an instruction unit when a calling routine having an original low privilege level desires to call on a service routine having a higher privilege level than the calling routine is normally permitted to access, said method comprising the steps of:

reading an access rights field contained in a register within the instruction unit to determine current access rights of the calling routine;

reading an access rights field of a page in the memory containing a gateway instruction indicated by the calling routine;

comparing the access rights field in the register within the instruction unit to the access rights field of the page in memory containing the gateway instructions indicated by the calling routine to determine whether the calling route is permitted entry to the page containing the gateway instruction; and performing the following substeps if the access rights field of the calling routine indicates that the calling routine is permitted entry to the page containing the gateway instruction:

raising the low privilege level of the calling routine to the higher privilege level specified by the gateway instruction, storing a return address and the low privilege level of the calling routine in a target register of the calling routine, so that the calling routine cannot forge its privilege level, branching control of the instruction unit from the calling routine to a location of the service routine as specified by the gateway instruction, executing the service routine, and returning control to the calling routine at an address specified by the target register with the original low privilege level stored in the target register.

2. A method as in claim 1 further comprising the step of trapping on the gateway instruction if the access rights field of the calling routine does not indicate that the calling routine is permitted entry to the page containing the gateway instruction.

3. A method as in claim 1 wherein the computer system has delayed branch instructions with a specified delay period, comprising the step of trapping on the gateway instruction if the delayed branch is pending when the access rights of the calling routine and the access rights of the page containing the gateway instruction are compared

* * * * *